United States Patent Office 3,432,563
Patented Mar. 11, 1969

3,432,563
PREVENTION OF "POPCORN" POLYMER IN THE MANUFACTURE OF RUBBER LATEX
Fred I. Metzler, 721 Yerrick Road,
Akron, Ohio 44212
No Drawing. Continuation-in-part of application Ser. No. 281,015, May 16, 1963. This application May 16, 1967, Ser. No. 638,763
U.S. Cl. 260—666.5     2 Claims
Int. Cl. C07c *15/10, 7/18*

ABSTRACT OF THE DISCLOSURE

Discloses a method of preventing, inhibiting or suppressing the undesirable polymerization of olefinic monomers resulting in the formation of popcorn polymer in the recovery system of a polymerization process. Prevention is achieved by introducing into the presence of the monomers a nonacidic solution of the reaction product of an acidic salt of hydroxylamine and the salt of an alkaline metal in which the aqueous solution has a pH or less than 12.

---

This application is a continuation-in-part application of my application Ser. No. 281,015, filed May 16, 1963, now abandoned.

This invention relates to the prevention of the initiation and growth of "popcorn" polymer.

The problem of preventing the formation of "popcorn" polymer or inhibiting its growth once it is formed is well known.

In well-known processes involving the polymerization of a diene monomer, such as butadiene-1,3, with a vinyl aryl monomer, such as styrene, in the manufacture of copolymers thereof, particularly where the polymerization of these monomers is carried out in a system sealed against the entrance of air, there is a tendency for an insoluble horny byproduct to form during certain stages of the process in various parts of the equipment, particularly in the vacuum flash tank and stripping columns as well as in the pipe lines interconnecting these parts of the equipment, and particularly in the butadiene vapor recovery lines. This horny byproduct is a highly branched and crosslinked random polymer having the appearance of cauliflower or popped popcorn. It is theorized that many free radical ends present in this polymerization system cannot terminate under the conditions present in various parts of the equipment used in this polymerization process with the result that a very rigid and hard, horny material is formed in such large amounts as to interfere with the efficient operation of the process and in some instances cause a shutdown because of clogged lines, resulting in loss of material, labor and production.

In the processes generally used in bringing about the polymerization of butadiene and styrene in, for example, the formation of GR–S, a well-known rubbery copolymer, conditions exist in the latex degassing facilities, also referred to as the butadiene recovery system of the polymerization process, which are ideal for the initiation of "popcorn" polymer. For example, temperatures of 50° C., the presence of rusty iron, the presence of 200 parts per million of a hydroperoxide and a small amount of butadiene will bring about the formation of "popcorn" polymer. Once the "popcorn" polymer has been formed, it then grows in the presence of any monomer subject to the free radical type of polymerization and the rate of growth is proportional to the amount of "popcorn" present and it tends to "mushroom," growing at a faster and faster rate as long as monomer is available to feed it. All of the conditions necessary for initiation and propagation of "popcorn" polymer are present in the vacuum flash tank and the vapor lines leading thereto and therefrom used in the continuous production of peroxide activated high solids butadiene/styrene latex and it is the prevention of the initiation and/or propagation of "popcorn" polymer in this type of equipment that is the primary concern of the present invention.

The conventional closed system for the emulsion polymerization of butadiene with styrene comprises a conventional reaction vessel equipped with a stirring mechanism and necessary heating or cooling means in which the monomers are caused to polymerize. After a suitable degree of polymerization is achieved, the polymerization reaction is stopped by the addition of a suitable short-stopping agent, such as potassium dimethyldithiocarbamate. The resulting polymer latex is then allowed to flow to the butadiene recovery system which comprises a flash tank which is under atmospheric pressure and at which time most of the residual butadiene is removed from the latex. The gaseous butadiene is then removed from the flash tank to a compressor where it is liquified for reuse. Some "popcorn" tends to form in the lines leading to the compressor. The butadiene degassed latex is then allowed to flow by gravity or pumped into a conventional vacuum flash tank where further butadiene and other dissolved gaseous materials are removed. The vacuum flash tank is maintained at a temperature of about 100° F. It is in this vacuum flash tank that the most ideal conditions for "popcorn" polymer formation exist because the tank is at the proper temperature; the butadiene vapors above the level of latex contained in the tank contain about 2% or less of styrene; and a certain amount of catalyst, such as cumene hydroperoxide or para menthane hydroperoxide, has vaporized and collected on the inner exposed metal surfaces of the tank above the level of the latex. These conditions will initiate "popcorn" polymer. The "popcorn" polymer will continue to grow as long as it is fed by a new supply of latex containing a small proportion of butadiene and other polymerizable monomer, such as styrene. The pipe lines leading to and from this vacuum flash tank are also ideal areas for "popcorn" polymer formation.

The latex is then pumped from the vacuum flash tank to a conventional styrene stripping column where the latex is passed countercurrent to a rising stream of steam, causing the styrene to be removed from the latex where it is then recirculated in a conventional manner to the reaction vessel for polymerization with butadiene. In the styrene stripping column "popcorn" polymer formation also tends to develop unless some precautions are taken to prevent its development.

It has now been discovered that in the polymerization of a diene monomer the recovery of the unreacted monomers may be carried out in a more facile, efficient, and economical manner by injecting into the recovery system a deactivating or inhibiting agent or compound capable of preventing or suppressing the initiation of a "popcorn" polymer in the recovery system, or suppressing or preventing the further propagation of "popcorn" polymer presently formed. More particularly, it has been discovered that the use of hydroxylamine sulfate neutralized to a nonacidic condition or alkalized to a pH of 11.0 to 12.0 with potassium hydroxide or other suitable neutralizing alkali introduced into the butadiene vapor recovery headers will greatly inhibit the initiation or propagation of "popcorn" polymer in the recovery system. The following example is illustrative of a polymerization process in which the formation of "popcorn" polymer is controlled. All parts are by weight unless otherwise indicated and the amount of various ingredients used does not affect the functioning of the "popcorn" inhibiting agent of this invention.

EXAMPLE

A group of twelve 2700 gallon reaction vessels connected in series were swept with nitrogen gas to remove all traces of gaseous oxygen and charged continuously by pumping the polymerization ingredients at a fixed rate into the first reactor in the series. The ratio of materials introduced was that given in the following recipe.

| Material | Parts |
| --- | --- |
| Butadiene | 69.0 |
| Styrene | 31.0 |
| Initial soap solution: | |
| Water | 27.5 |
| Tall oil soap (sold as Potassium Nylox TG, composed of 60% potassium salt of disproportionated rosin, 30% potassium salt of fatty acids, and 10% of other esters and nonsaponifiables) | 2.0 |
| Tamol N (sodium salt of a naphthalene sulfonic acid condensed with $CH_2O$) | 0.75 |
| Electrolyte (potassium sulfate) | 0.485 |
| Sequestering agent (Versene Fe–3 composed of 90% tetrasodium salt of ethylenediamine tetraacetic acid, 10% monosodium salt of N,N-di(alpha-hydroxyethyl)glycine) | 0.024 |
| Ferrous sulfate heptahydrate ($FeSO_4 \cdot 7H_2O$) | 0.00026 |
| Potassium hydroxide | 0.0585 |
| Activator solution: | |
| Water | 15.0 |
| Sequestering agent (Versene Fe–3) | 0.0032 |
| Ferrous sulfate heptahydrate | 0.0016 |
| Sodium formaldehyde sulfoxylate | 0.15 |
| Diisopropylbenzene hydroperoxide | 0.23 |
| Modifier (tertiary dodecylmercaptan) | 0.01 |

Polymerization was initiated in the first reactor and continued in succeeding reactors until the desired conversion level was reached in the final reactor. Temperatures in the reactors in this series were maintained at levels between 41° F. and 50° F. To promote the polymerization and to control the colloidal properties of the final latex, incremental additions of a soap solution having the following parts ratio were added continuously at intervals along the reactor series in accordance with well-known practice.

| Material | Parts |
| --- | --- |
| Incremental soap solution (water) | 23.0 |
| Sequestering agent (Versene Fe–3) | 0.0096 |
| Ferrous sulfate heptahydrate | 0.00027 |
| Tamol N | 0.60 |
| Electrolyte (potassium sulfate) | 0.415 |
| Oleic acid | 0.66 |
| Potassium hydroxide | 0.13 |
| Tall oil soap | 0.25 |

This system was operated continuously, raw materials were added as indicated and finished latex was removed from the system as it was produced. The polymerization was permitted to progress until approximately 60% of the monomer content was converted to polymer, at which point 0.2 part of potassium dimethyldithiocarbamate was added to the reaction vessel and stirred thoroughly into the latex. The resulting latex containing 40% solids was then allowed to flow to an atmospheric flash tank maintained at room temperature of between 65° F. and 95° F. where unreacted butadiene was removed together with any other materials that were gaseous at atmospheric pressures. The partially degassed latex was then allowed to flow to a second flash tank which was maintained under an absolute pressure of 200 mm. of mercury and heated to 100° F. to remove additional quantities of unreacted butadiene and other materials that volatilize under these conditions. The latex was then pumped into a conventional styrene stripping column where it was subjected to a rising stream of steam which acted to remove unreacted styrene monomer. The resulting stripped latex was then collected and adjusted for solids content. This process was continuously run for a period of three months, and inspected periodically for "popcorn" polymer formation.

The formation of "popcorn" polymer in the butadiene vapor recovery line during the three-month test period required cleaning on an average of 1.9 months, the average amount of cleanings of the vapor line, as well as the knockout tank, was 10,475 pounds, all of which was considered to be "popcorn" polymer.

The same polymerization system described above was operated under identical conditions with the exception that a solution of 3.77% of hydroxylamine sulfate was added once every 24 hours to the vapor header. The hydroxylamine sulfate solution was made up by adding .2 part of hydroxylamine sulfate to 4.9 parts of soft water and about .15 part of potassium hydroxide was added in order to adjust the pH between 11.0 and 12.0. This hydroxylamine sulfate solution moved through the vapor header and collected in the knockout tank. The amount of this solution added every 24 hours amounted to 5 gallons. After 8.2 months operation of the system using hydroxylamine sulfate as the "popcorn" polymer inhibitor, an accumulation of only 600 pounds of "popcorn" polymer was found, compared to 10,475 pounds for a period of operation of only 1.9 months.

Neutralized or alkalized hydroxylamine sulfate may be used in preventing "popcorn" polymer, in reactions involving the polymerization of a conjugated diene monomer, particularly in the presence of styrene, in amounts from about .001 part to about .05 part per 100 parts of butadiene vapor passing through the recovery system, the parts being by weight. It is found that effective inhibition or prevention of "popcorn" polymer formation takes place economically when between .005 and .009 part is used.

Hydroxylamine functions to prevent "popcorn" polymer formation or growth in any polymerization system where a monomer is caused to be polymerized by the presence of free radicals and particularly in those systems where such monomers as a conjugated diene, such as butadiene, or a vinyl aryl monomer, such as styrene, are present. The hydroxylamine is added to the recovery system of the polymerization process and not to the polymerization mixture in the reaction vessel.

The effective prevention of "popcorn" polymer formation by the use of hydroxylamine is not dependent upon temperature conditions or upon the presence of catalysts, antioxidants, short stopping agents, or other ingredients generally used in polymerization reactions.

While certain representative embodiments and details have been shown for the purpose of illustrating the invention, it will be apparent to those skilled in this art that various changes and modifications may be made therein without departing from the spirit or scope of the invention.

What is claimed is:

1. A method of suppressing the formation of popcorn polymer in the recovery system of a polymerization process in which the butadiene and styrene monomers are recovered, which comprises introducing into the presence of the monomer being recovered an aqueous solution obtained by neutralizing hydroxylamine sulfate to a pH between 11 and 12 with potassium hydroxide and in an amount sufficient to suppress the formation of popcorn polymer.

2. A method of suppressing the formation of popcorn polymer in the recovery system of a polymerization process in which butadiene and styrene monomers are recovered, which comprises introducing into the presence of the monomer being recovered a nonacidic aqueous solution of the reaction product of hydroxylamine sulfate and a neutralizing alkali and in an amount sufficient to suppress the formation of popcorn polymer.

References Cited

UNITED STATES PATENTS 3,148,225  9/1964  Albert _____ 260—666.6

JAMES A. SEIDLECK, *Primary Examiner.*

U.S. Cl. X.R.

260—84.1, 85.1, 669